March 8, 1927.

D. W. OHAVER 1,620,384

RESILIENT TIRE TRACTION DEVICE

Filed May 23, 1925

Inventor:
DAVID W. OHAVER
By Edgar M. Kitchin
his Attorney.

March 8, 1927.
D. W. OHAVER
1,620,384
RESILIENT TIRE TRACTION DEVICE
Filed May 23, 1925
2 Sheets-Sheet 2
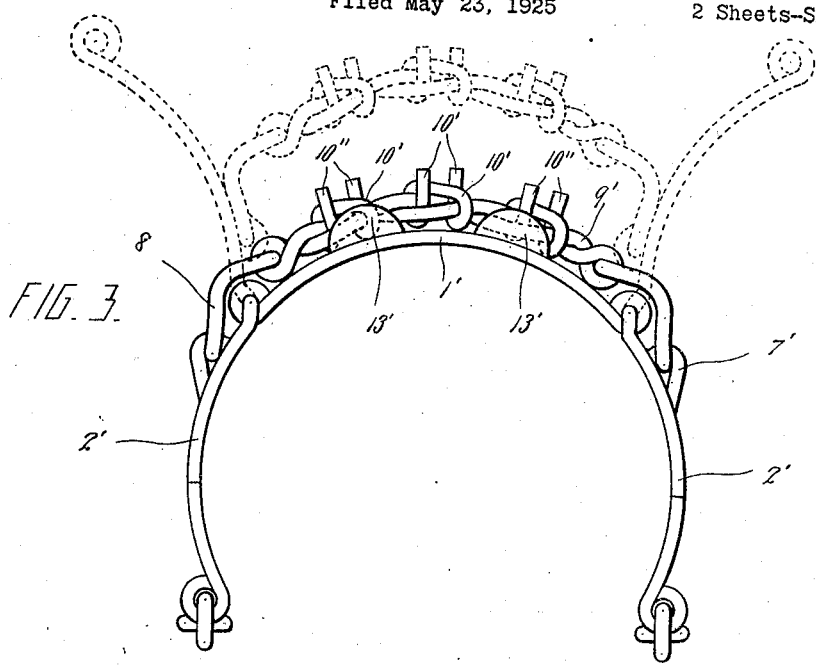
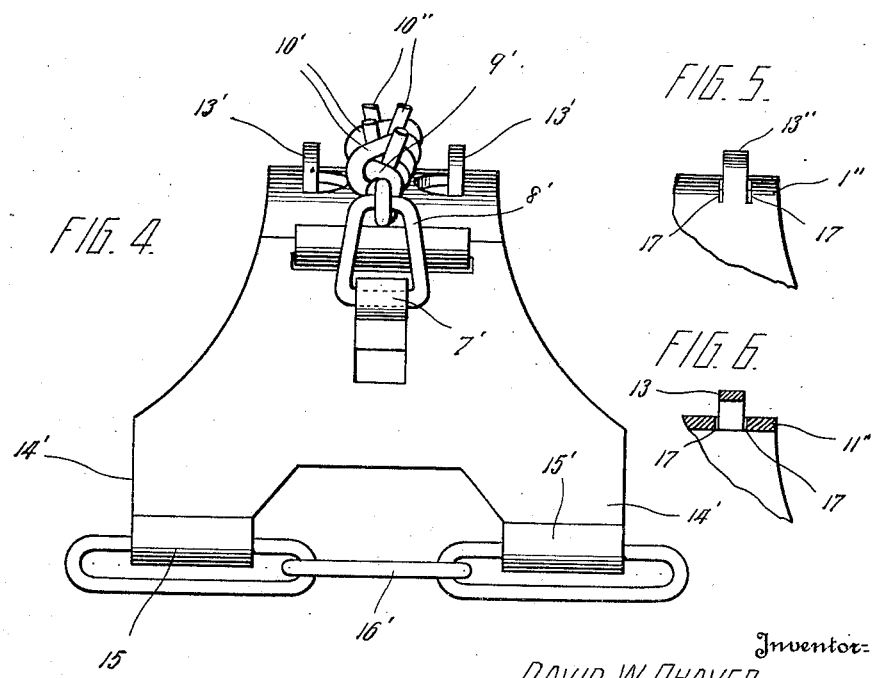
Inventor:
DAVID W. OHAVER
By Edgar M. Kitchin,
his Attorney.

Patented Mar. 8, 1927.

1,620,384

UNITED STATES PATENT OFFICE.

DAVID W. OHAVER, OF ROCKVILLE, INDIANA.

RESILIENT-TIRE TRACTION DEVICE.

Application filed May 23, 1925. Serial No. 32,337.

This invention relates to improvements in devices adapted to be applied to pneumatic and like resilient tires for increasing traction and providing against tendency to skid.
The object in view is the provision of a tire armor or tread surface easy of application and removal, and especially well adapted in use for increasing the friction between the tire and the ground without liability of injury to the tire.

With this and further objects in view as will in part hereinafter become apparent and in part be stated, the invention comprises certain novel constructions, combinations and arrangements of parts as subsequently specified and claimed.

In the accompanying drawings,—

Figures 3 and 4 are views similar respectively to Figures 1 and 2 of a slightly modified embodiment.

Figure 5 is a detail, fragmentary, side elevation of a further slight modification.

Figure 6 is a circumferential section through the parts seen in Figure 5.

Figure 1:
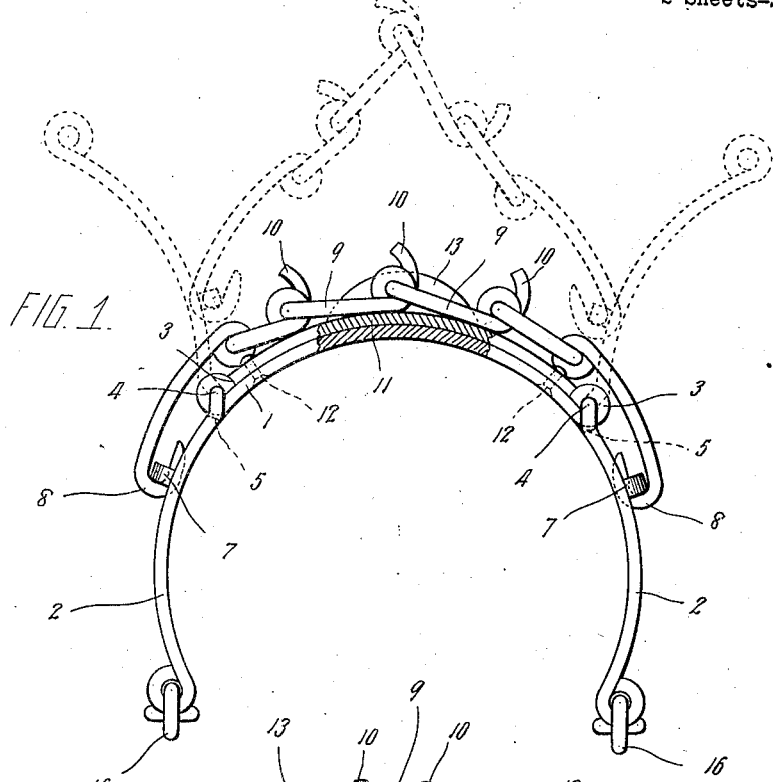
Figure 1 is an edge view of a device embodying features of the present invention, parts being broken away in section, and the parts being seen in full lines in the position occupied in use on a tire and in dotted lines in the position when being applied to or removed from a tire.
Figure 2:
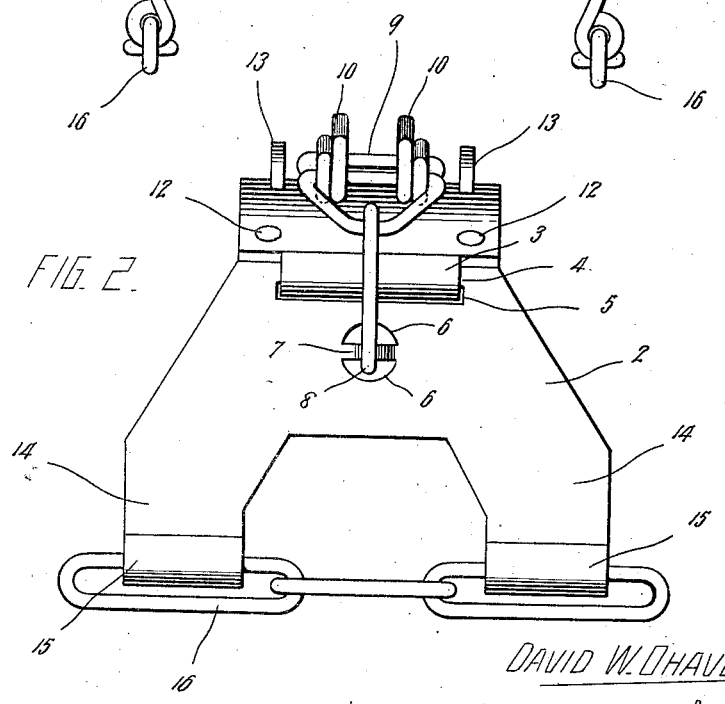
Figure 2 is a side elevation thereof.

Referring to the drawings by numerals, 1 indicates a cross plate or tread plate to the ends of which are hinged the side plates 2, 2, the said tread plate and side plates being arched to conform to the contour of the engaged tire. The hinged connection between each of the side plates 2 and the tread plate 1 may assume any of various forms, but preferably consists of an eye 3 rolled from a reduced tongue-like extension from the respective end of plate 1 about a pintle 4 formed of the material of the side plate 2 by the stamping out of a slot 5 therein for the passage of the material of eye 3. Each pintle 4 is preferably rounded, as by having the edges rounded off after stamping to avoid undue friction between pintle 4 and the respective eye 3. The plates 1 and 2 may be formed of any appropriate or desirable material, and I find it entirely practical to utilize a heavy gauge of sheet metal which possesses sufficient stability for the service required, and at the same time is sufficiently light for the punching and stamping required for simplicity and effectiveness of construction both of the hinges above described and of other parts hereinafter mentioned.

Each side plate 2 is stamped or otherwise formed with approximately semi-circular openings 6, 6, spaced sufficiently for providing a cross bar 7, which bar is preferably stamped laterally outward to the position seen in Figure 1. Each cross bar 7 is engaged by a hook 8 on the respective terminal link of a cross chain 9. The chain 9 is preferably roughened or formed with friction increasing devices, such as the outstanding barbs 10, 10. The chain 9 is of such a length as to be rendered taut when the plates 2 are in their lowered or operative position, as seen in full lines in Figure 1. An operator may, however, in applying the parts to a tire, grasp an intermediate portion of chain 9 and lift the parts to the position indicated in dotted lines in Figure 1, whereat the parts are especially well adapted to be easily and quickly applied to the tread of a tire. When the cross plate 1 rests on the tread, the operator releases the chain and the side plates 2 fall to a position approximating their final operative location, but not quite to that location. The operator then grasps the lower portions of the plates 2 and forces them downward to and anchors them in their final operative position, which effects tensioning of the chain 9 to a very taut condition across the top of the plate 1.

To avoid unnecessary noises, such as incident to movement of metal against metal, a cushion 11, of leather or appropriate fabric and the like, is preferably applied directly upon the upper surface of the plate 1 and appropriately anchored thereto, as by rivets 12, 12. Radially outstanding ears or lugs 13, 13 are preferably stamped directly from the material of plate 1 to an outstanding position at the opposite edges of the chain 9, so that even if the chain loosens incident to stretching or otherwise, it will be limited in its lateral play and cannot escape circumferentially from a position engaging the plate 1 or its cushion 11 in lieu thereof.

The plates 2 are susceptible of being given various shapes, one of which is illustrated in the drawings consisting of a bifurcated, radially inward portion providing the furcations 14, 14, each terminating in an eye 15 for receiving the anchoring chain 16. The eyes 15 are preferably formed by merely rolling the material of the respective furcations 14, but may, of course, be otherwise formed if desired. The chains 16 may either be the usual circumferential tire chains or may be independent segments connected by appropriate anchorage means extending through the wheel body radially inward of the felly and appropriately anchored as desired, as, for instance, by being connected directly to a spoke.

It will be understood, of course, that as many of the devices made up of plates 1 and 2 and their connected parts will be utilized as may be preferred on any given tire from one upward, according to the conditions and requirements for friction.

In Figures 3 and 4 is illustrated a slightly different embodiment of the invention from that just described, the chief difference residing in the character of cross chain employed. The cross plate 1' and side plates 2' are substantially identical in form and function with those above described, and each of the side plates is formed with an eye 7' functioning substantially the same as the cross bar 7 of the structure above described. Each of the eyes 7' is preferably formed by the stamping of a strip of the respective plate 2' from said plate except at its outward terminus and the looping of said strip to form the eye, the free end of the strip being then electrically welded or otherwise appropriately anchored to the main portion of the respective plate 2 after the application of the terminal links 8' of the cross chain 9. Of course, the terminal links 8' may be formed otherwise than integral as shown, and in that event may be applied to the eyes 7' after the completion thereof, and this, of course, is particularly desirable for replacement cross chains. The cross chain 9 consists of the terminal links 7 and an intermediate link connecting the terminal links and formed of two lapping strands of a rod twisted together. To increase the friction of the chain there are provided link-like bars 10', 10', each intertwined about the rods making up the links 9 and having end portions extending upwardly between said rods for forming outstanding barbs 10'', 10''.

The cross chain 9' is rendered taut in use in the same manner as the chain 9, and is restrained against circumferential displacement from engagement with plate 1' by stops consisting of radially outstanding ears or tabs 13', 13', preferably stamped directly from the material of the plate 1, as by having an arcuate slit formed in the plate and the resulting tongue bent outward for each tab.

The radially inward portions of the plates 2' are substantially the same as in plates 2, each being bifurcated, as at 14', terminating in eyes 15' engaging the anchoring chain 16'.

The stops formed by the ears or tabs 13 and 13' may be otherwise formed in numerous ways, one of which consists of double slitting the material of the respective plate and stamping up the strip thus released while leaving its ends anchored as seen in Figures 5 and 6 in which 1'' is the cross plate or tread plate, and 13'' is the stop stamped outward from the plate by having parallel slits 17 formed in the plate, and the strip between the plate stamped into the shape seen in Figures 5 and 6, while leaving the ends of the strip integral with the balance of the plate 1''.

The plates 1 and 2, or their equivalents, will, of course, be shaped and proportioned to conform to the particular tire to which the tread armor is to be applied, and the device is especially well adapted for any tires now in use from the softest of the pneumatic tires, commonly known as balloon tires, to the least resilient tires in use, such as solid tires, a difference in shape only being required for adapting an embodiment of the invention to any and all such tires. It will be observed also that the three plates hinged together with their connection to the anchoring chain, such as chain 16, are capable of radially flexing in unison with the parts of the tire engaged so as to receive a large portion of the frictional wear and not to impart the same to the tire or to otherwise chafe or injure the tire.

What is claimed is:—

1. A resilient tire armor comprising a metallic cross tread plate, side plates hinged thereto, a cable arranged exteriorly of the side plates and cross plate and pivoted at its ends to the side plates at points spaced for causing the cable to be rendered taut by the location of the side plates in their operative position about the sides of a tire, and a cushion disposed between the outer face of the cross plate and the cable.

2. A resilient tire armor comprising a cross tread plate, side plates hinged thereto, a cable arranged exteriorly of the side plates and cross plate and pivoted at its ends to the side plates at points spaced for causing the cable to be rendered taut by the location of the side plates in their operative position about the sides of a tire, and stops outstanding radially from and formed integral with the cross plate in the path of lateral play of the cable.

3. In resilient tire armor, the combination of a cross tread plate, side plates hinged to the ends of the cross plate and adapted to be located against the sides of a tire, a chain cable pivoted at its ends to the side plates and proportioned to be retained taut across the tread plate while the side plates are retained against the sides of the tire, and barbs outstanding substantially radially from the cable beyond the lines of the links comprising the cable.

4. In resilient tire armor, the combination of a cross tread plate, side plates hinged to the ends of the cross plate, and a cable pivoted at its ends to the side plates, each of the said side plates having a portion formed from the material of the plate for affording pivotal connection of the cable.

5. In resilient tire armor, the combination of a cross tread plate having eyes rolled from the material of the plate at the terminals thereof, a side plate at each end of the cross plate having a slot through which the respective terminal eye extends for forming a hinged connection, and a cable lying exteriorly of the cross plate and pivoted at its terminals to the side plates.

6. A resilient tire armor comprising a cross plate, side plates hinged to the terminals of the cross plate, and a chain cable arranged exteriorly of the cross plate and having its terminal links pivoted to the side plates and curved to arch over the pivotal connections between the side plates and the cross plate.

In testimony whereof I affix my signature.

DAVID W. OHAVER.